(12) United States Patent
Bashar et al.

(10) Patent No.: US 9,258,104 B2
(45) Date of Patent: Feb. 9, 2016

(54) PATTERN INDICATOR SIGNAL FOR NEW DMRS PATTERN

(71) Applicant: Intel IP Corporation, Santa Clara, CA (US)

(72) Inventors: Shafi Bashar, Santa Clara, CA (US); Seunghee Han, Kyoungkido (KR); Jong-Kae Fwu, Sunnyvale, CA (US); Alexei Vladimirovich Davydov, Nizhny Novgorod (RU); Mo-Han Fong, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/137,500

(22) Filed: Dec. 20, 2013

(65) Prior Publication Data
US 2014/0302887 A1 Oct. 9, 2014

Related U.S. Application Data

(60) Provisional application No. 61/808,597, filed on Apr. 4, 2013.

(51) Int. Cl.
*H04L 5/00* (2006.01)
*H04B 7/02* (2006.01)
(Continued)

(52) U.S. Cl.
CPC ............... *H04L 5/0094* (2013.01); *H04B 1/38* (2013.01); *H04B 7/024* (2013.01); *H04L 5/0053* (2013.01); *H04W 24/02* (2013.01); *H04W 74/0808* (2013.01); *H04W 76/00* (2013.01); *H04W 76/022* (2013.01); *H04B 7/0456* (2013.01);
(Continued)

(58) Field of Classification Search
CPC ... H04W 28/04; H04W 72/04; H04W 74/006; H04B 7/024; H04B 7/0456; H04B 7/0639; H04L 5/0053; H04L 5/0096
USPC ............ 455/69, 450–452.2, 509, 522, 550.1; 370/328–330
See application file for complete search history.

(56) References Cited

U.S. PATENT DOCUMENTS 8,718,662 B2 * 5/2014 Shan et al. ..................... 455/450
2011/0019776 A1 1/2011 Zhang et al.
(Continued)

FOREIGN PATENT DOCUMENTS

EP 2533589 A1 12/2012
WO WO-2014165656 A1 10/2014

OTHER PUBLICATIONS

"3rd Generation Partnership Project; Technical Specification Group Radio Access Network; Evolved Universal Terrestrial Radio Access (E-UTRA); Physical Channels and Modulation (Release 11)", 3GPP TS 36.211 V11.2.0, (Feb. 2013), 109 pgs.
(Continued)

*Primary Examiner* — Simon Nguyen
(74) *Attorney, Agent, or Firm* — Schwegman Lundberg & Woessner, P.A.

(57) ABSTRACT

A small cell station communicates with user equipment utilizing a reduced overhead demodulation reference signal (DMRS) pattern when good channel conditions are detected. An indicator field is used to identify whether a reduced overhead DMRS pattern is being transmitted. If appropriate, the reduced overhead DMRS pattern is generated and transmitted by the small cell station and received and used by the user equipment as indicated by the indicator field.

19 Claims, 4 Drawing Sheets

(51) Int. Cl.
| | |
|---|---|
| *H04W 24/02* | (2009.01) |
| *H04W 74/08* | (2009.01) |
| *H04B 1/38* | (2015.01) |
| *H04W 76/00* | (2009.01) |
| *H04W 76/02* | (2009.01) |
| *H04W 36/30* | (2009.01) |
| *H04B 7/04* | (2006.01) |
| *H04B 7/06* | (2006.01) |
| *H04W 76/04* | (2009.01) |
| *H04W 76/06* | (2009.01) |

(52) U.S. Cl.
CPC .............. *H04B 7/0639* (2013.01); *H04W 36/30* (2013.01); *H04W 76/041* (2013.01); *H04W 76/068* (2013.01)

(56) References Cited

U.S. PATENT DOCUMENTS

| | | | |
|---|---|---|---|
| 2013/0265945 | A1 | 10/2013 | Hong et al. |
| 2013/0265955 | A1* | 10/2013 | Kim et al. ................ 370/329 |
| 2014/0133395 | A1* | 5/2014 | Nam et al. ................ 370/328 |
| 2014/0241150 | A1* | 8/2014 | Ng et al. .................. 370/229 |
| 2014/0241287 | A1* | 8/2014 | Cheng et al. ............. 370/329 |
| 2014/0286255 | A1* | 9/2014 | Nam et al. ................ 370/329 |
| 2014/0293881 | A1* | 10/2014 | Khoshnevis et al. ..... 370/329 |
| 2014/0293900 | A1* | 10/2014 | Takeda et al. ............ 370/329 |
| 2015/0085785 | A1* | 3/2015 | Kim et al. ................ 370/329 |

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.1.0, (Dec. 2012), 160 pgs.

"3rd Generation Partnership Project; Technical Specification Group Radio Access Network; Evolved Universal Terrestrial Radio Access (E-UTRA); Physical layer procedures (Release 11)", 3GPP TS 36.213 V11.2.0, (Feb. 2013), 173 pgs.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, (Mar. 2013), 344 pgs.

"Analysis and initial evaluation results for overhead reduction and control signaling enhancements", 3GPP TSG RAN WG1 Meeting #72 R1-130022, (2013), 6 pgs.

"Discussion on spectral efficiency improvement for small cell enhancements", 3GPP TSG RAN WG1 Meeting #72 R1-130354, (2013), 6 pgs.

"Evaluation Assumptions on Schemes to Enhance Small Cell Spectral Efficiency", 3GPP TSG RAN WG1 Meeting #72 R1-130491, (2013), 4 pgs.

"International Application Serial No. PCT/US2014/032795, International Search Report mailed Aug. 19, 2014", 3 pgs.

"International Application Serial No. PCT/US2014/032795, Written Opinion mailed Aug. 19, 2014", 7 pgs.

"Overhead reduction for spectrum efficiency improvement", 3GPP TSG RAN WG1 Meeting #72 R1-130057, (2013), 4 pgs.

Electronics, LG, "Initial evaluation of DM-RS reduction for small cell", R1-130266, 3GPP TSG RAN WG1 Meeting #72, (2013).

Incorporated, Qualcomm, "Overhead reduction", R1-130594, 3GPP TSG RAN WG1 #72, (2013).

ZTE, "Downlink DMRS redunction for small cell", R1-130138, 3GPP TSG RAN WG1 Meeting #72, (2013).

\* cited by examiner

PATTERN INDICATOR SIGNAL FOR NEW DMRS PATTERN

RELATED APPLICATION

This application claims priority to U.S. Provisional Application Ser. No. 61/808,597 (entitled PATTERN INDICATOR SIGNAL FOR NEW DMRS PATTERN, filed Apr. 4, 2013) which is incorporated herein by reference in its entirety.

BACKGROUND

Demodulation reference signals (DMRS) are used in cellular networks to determine the quality of downlink and uplink channels. These reference signals can consume significant amounts of bandwidth that might otherwise be available for communications.

DETAILED DESCRIPTION

Figure 1A:
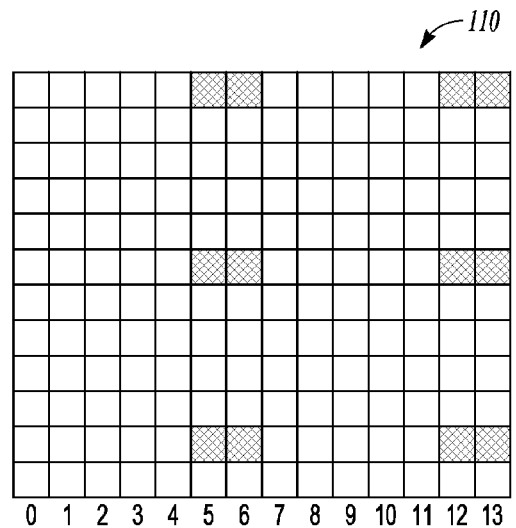
FIGS. 1A, 1B, 1C, 1D, and 1E are block diagrams of demodulation reference signal (DMRS) pattern designs to reduce overhead in small cell scenarios according to an example embodiment.
Figure 1B:
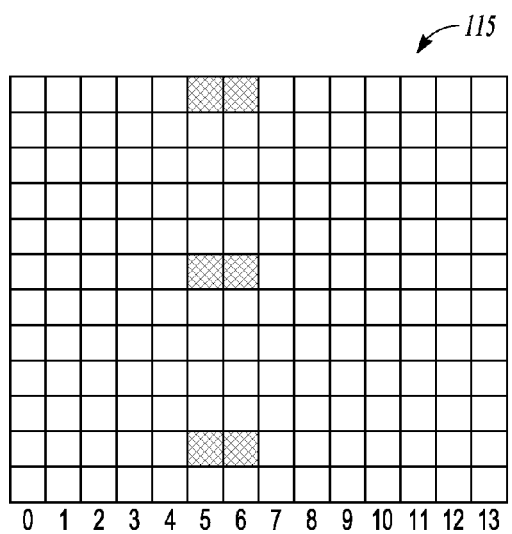
Figure 1C:
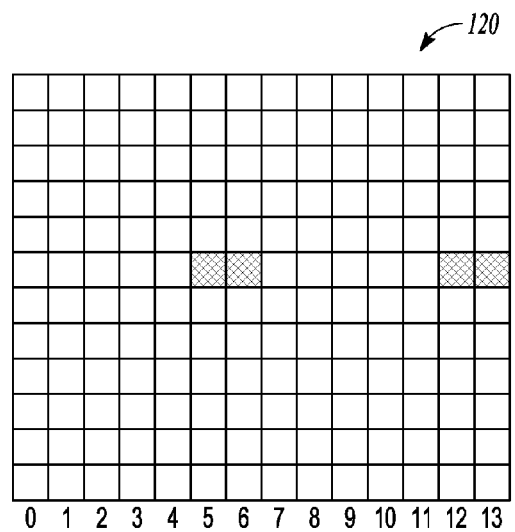
Figure 1D:
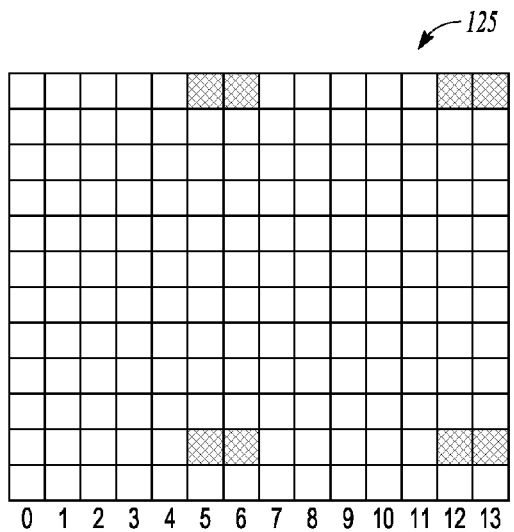
Figure 1E:
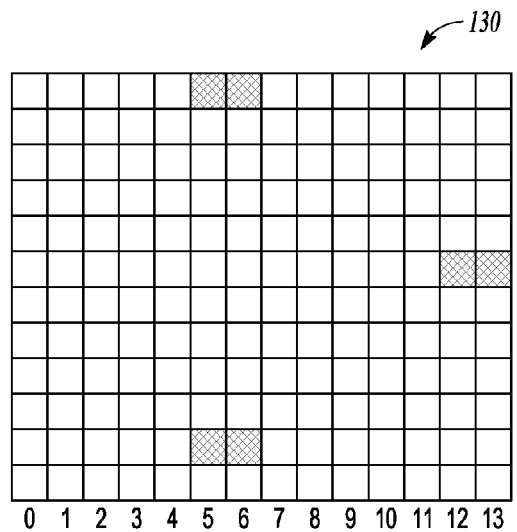

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Potential spectral efficiency improvement may be achieved by reducing the downlink UE-specific demodulation reference signal (DMRS) overhead. Due to reduced distance between eNodeB and UE (user equipment) for this scenario, the received signal power at UE is expected to be higher, resulting in higher SNR (signal to noise ratio) at the receiver. The reduced distance also indicates reduced maximum delay spread of a multipath channel. Since the small cell scenario is considered for low mobility/stationary traffic use cases, the Doppler spread of the channel will be smaller. As a result, a relatively flat, slowly varying channel condition is expected in small cells. Therefore, by reducing overhead of DMRS transmission compare to Release-10 DMRS design, spectral efficiency can be improved while keeping the channel estimation degradation to a minimum. DMRS overhead reduction can be achieved by reducing DMRS in frequency, time or both.

Small cells are generally lower powered nodes in a communication network that operate in a radio spectrum with a range of about ten meters to up to one or two kilometers. This is as opposed to macro cells, which may have a range of up several tens of kilometers. Small cells communicate directly with user equipment, such as cell phones and other mobile devices and provide data offloading for macro cells, allowing an increase in network capacity the number of mobile devices that may be handled. In some embodiments, the mobile devices may be fairly stationary and close to the small cells, allowing DMRS overhead reduction for mobile devices communicating with the small cells. Example uses of small cells include but are not limited to providing home and small business in-building, and outdoor wireless service.

FIGS. 1A, 1B, 1C, 1D, and 1E illustrate multiple example DMRS pattern designs that provide for reduced overhead for small cell scenarios at 110, 115, 120, 125, and 130. In addition to the example illustrated patterns, subframe bundling based DMRS overhead reduction may also be applied, where no DMRS is transmitted in PRB (physical resource block) pairs, and the channel estimation is based on the DMRS transmitted in the PRB pairs of the adjacent subframe, or the adjacent PRBs.

Figure 2A:
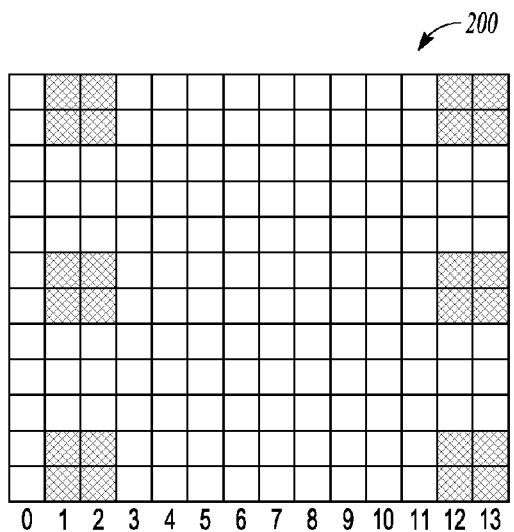
FIGS. 2A and 2B are example DMRS pattern designs for NCT according to an example embodiment.
Figure 2B:
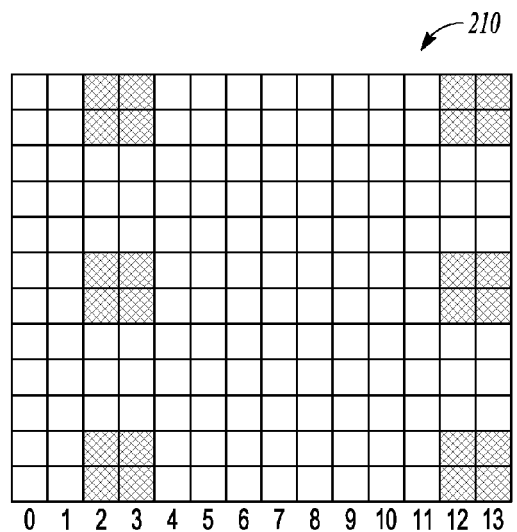

In NCT, CRS based demodulation is not used, therefore, the new DMRS pattern design may be optimized for all 14 symbols in a subframe. For example, In FIGS. 2A and 2B, example new DMRS pattern designs for NCT are illustrated 200 and 210. For both the reduced overhead DMRS design for small cell and new DMRS design for NCT, eNodeB needs to indicate to the UE whether the transmitted DMRS pattern is legacy Release-10 pattern or new Release-12 pattern.

In some situations, eNodeB may dynamically switch between the legacy Release-10 pattern and the new Release-12 design depending on channel conditions. For example, eNodeB scheduler can choose to use the Release-10 DMRS pattern to transmit reference signal if the channel condition deteriorates, whereas the reduced overhead DMRS pattern may be used for small cell scenarios with good channel condition to increase the spectral efficiency. Deterioration of channel conditions may be said to begin when the SNR decreases to a point that throughput also starts to decrease. Some decrease in throughput may be tolerable, but when it affects data transfer or voice quality, the channel is deemed to have sufficiently deteriorated to switch to a higher overhead pattern. The point may be defined as anywhere between the start of throughput degradation and tolerable throughput decrease.

Therefore, in the Release-12 design, a new indicator field may be defined to indicate to the UE whether the DMRS pattern is legacy Release-10 pattern or a new Release-12 pattern. Such indicator signal may be implemented in the LTE standards in the two different ways, by introducing new bit fields in the DCI (downlink control information) signal, or by introducing new bit fields in the RRC (radio resource control) signaling.

If dynamic switching between Release-10 pattern and Release-12 pattern is used, then an indicator signal used in DCI is more appropriate. On the other hand, by introducing the indicator field in RRC signaling, a semi static allocation is possible, with reduced overhead. Two different bit fields can be introduced, where bit field 0 can indicate the transmission of reduced overhead DMRS signal and the bit field 1 can indicate the transmission of new DMRS patterns introduced for NCT. Alternatively, a single bit field can also be used to indicate the transmission of Rel-12 or Rel-10 DMRS pattern. Depending on the scenario, UE may interpret the Rel-12 signal as reduced overhead DMRS signal or the new DMRS patterns in NCT.

Figure 3:
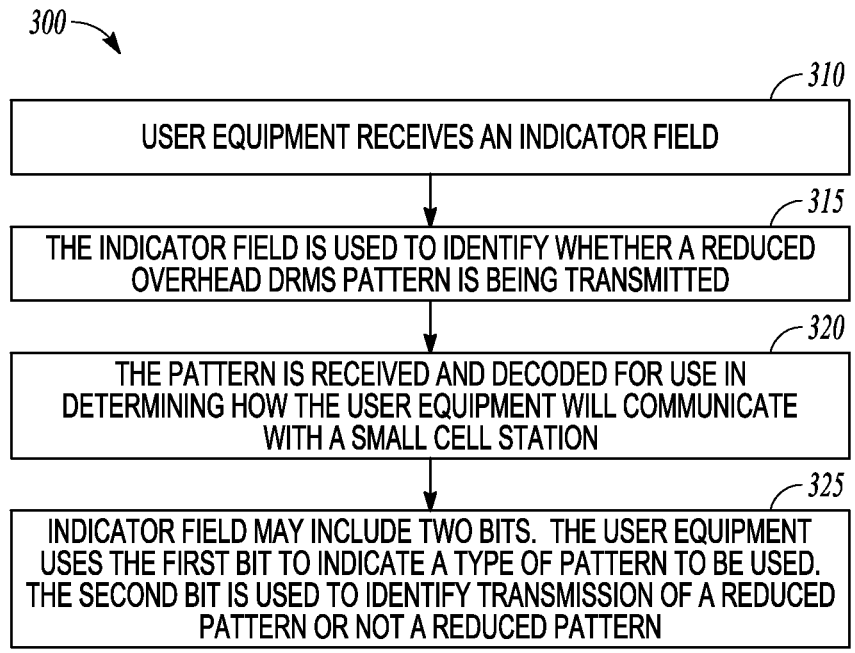
FIG. 3 is a flowchart representation of a method implemented by user equipment according to an example embodiment.

FIG. 3 is a flowchart illustration of a method 300 implemented by a device such as user equipment in one embodiment. The user equipment receives an indicator field at 310. The indicator field is used by the user equipment to identify whether a reduced overhead DMRS pattern is being transmitted at 315. The pattern is received and decoded at 320 for use in determining how the user equipment will communicate with a small cell station. In one embodiment, the indicator field includes two bits. The user equipment uses the first bit to indicate a type of pattern to be used. The second bit is used to identify transmission of a reduced pattern or not a reduced pattern.

Figure 4:
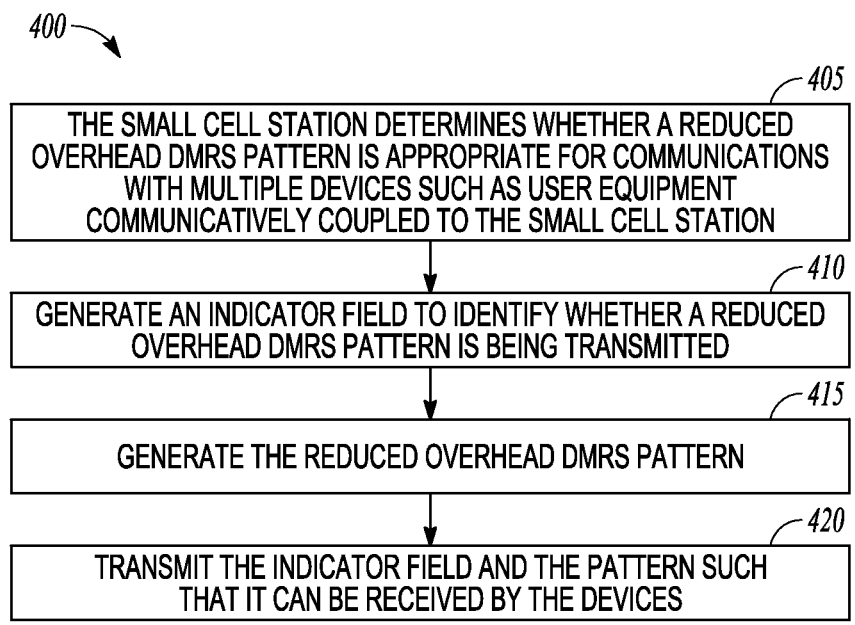
FIG. 4 is a flowchart representation of a method implemented by a small cell station according to an example embodiment.
Figure 5:
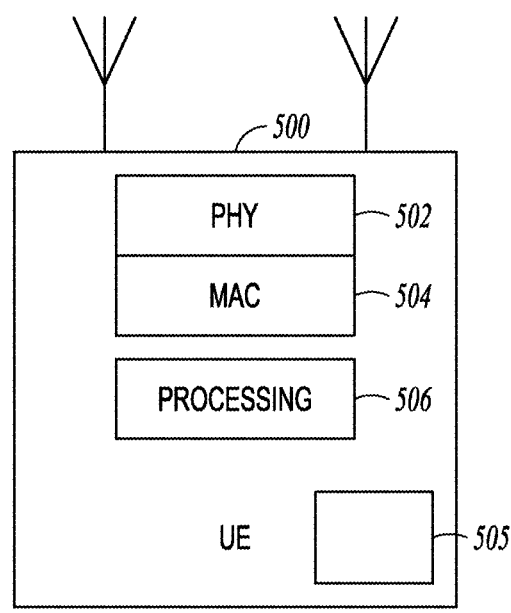
FIG. 5 is a block diagram of a communication system for implementing various example embodiments.

FIG. 4 is a flowchart illustration of a method 400 implemented by a small cell station to communicate with multiple user equipment. At 405, the small cell station determines whether a reduced overhead DMRS pattern is appropriate for communications with multiple devices such as user equipment communicatively coupled to the small cell station. The station then generates an indicator field at 410 to identify whether a reduced overhead DMRS pattern is being transmitted. At 415, the station generates the reduced overhead DMRS pattern. At 420, the station transmits the indicator field and the pattern such that it can be received by the devices.

DCI format 2B, 2C and 2D are used for assignment of transmission mode 8, 9 and 10 respectively. Additional DCI format or transmission mode may also be introduced in Release-12 that can make use of DMRS based transmission schemes. In all these cases, additional 1 or 2 bits long field can be introduced in DCI signal to indicate the transmission of Release-10 DMRS or the Release-12 DMRS pattern. As for an example, the following example changes may be used in Section 5.3.3.1.5D in [7] to reflect such changes in DCI format 2D (changes shown in italics):

The following information is transmitted by means of the DCI format 2D:
Carrier indicator—0 or 3 bits. The field is present according to the definitions in [3].
Resource allocation header (resource allocation type 0/type 1)—1 bit as defined in section 7.1.6 of [3]
If downlink bandwidth is less than or equal to 10 PRBs, there is no resource allocation header and resource allocation type 0 is assumed.
Resource block assignment:
For resource allocation type 0 as defined in section 7.1.6.1 of [3]
$\lceil N_{RB}^{DL}/P \rceil$ bits provide the resource allocation
For resource allocation type 1 as defined in section 7.1.6.2 of [3]
$\lceil \log_2(P) \rceil$ bits of this field are used as a header specific to this resource allocation type to indicate the selected resource blocks subset 1 bit indicates a shift of the resource allocation span
$(\lvert N_{RB}^{DL}/P \rvert - \lceil \log_2(P) \rceil - 1)$ bits provide the resource allocation where the value of P depends on the number of DL (downlink) resource blocks as indicated in section[7.1.6.1] of [3]
TPC command for PUCCH (physical uplink control channel)—2 bits as defined in section 5.1.2.1 of [3]
Downlink Assignment Index (this field is present in TDD (time division duplex) for all the uplink—downlink configurations and only applies to TDD operation with uplink
downlink configuration 1-6. This field is not present in FDD (frequency division duplex))—2 bits
HARQ (hybrid automatic repeat request) process number—3 bits (FDD), 4 bits (TDD)
Antenna port(s), scrambling identity and number of layers—3 bits as specified in Table 5.3.3.1.5C-1 where
$n_{SCID}$ is the scrambling identity for antenna ports 7 and 8 defined in section 6.10.3.1 of [2]
SRS request—[0-1] bit. This field can only be present for TDD and if present is defined in section 8.2 of [3] In addition, for transport block 1:
Modulation and coding scheme—5 bits as defined in section 7.1.7 of [3]
New data indicator—1 bit
Redundancy version—2 bits
In addition, for transport block 2:
Modulation and coding scheme—5 bits as defined in section 7.1.7 of [3]
New data indicator—1 bit
Redundancy version—2 bits
PDSCH (physical downlink shared channel) RE Mapping and Quasi-Co-Location Indicator—2 bits as defined in sections 7.1.9 and 7.1.10 of [3]
HARQ-ACK resource offset (this field is present when this format is carried by EPDCCH (enhanced physical downlink control channel). This field is not present when this format is carried by PDCCH)—2 bits as defined in section 10.1 of [3]. The 2 bits are set to 0 when this format is carried by EPDCCH on a secondary cell.
DMRS pattern indicator—2 bits, as specified in the following table:

| Bit field 0 | Bit field 1 | Message |
| --- | --- | --- |
| 0 | 0 | Rel-10 DMRS pattern |
| 0 | 1 | NCT DMRS pattern |
| 1 | 0 | Reduced overhead DMRS pattern |
| 1 | 1 | Reserved |

If both transport blocks are enabled; transport block 1 is mapped to codeword 0; and transport block 2 is mapped to codeword 1.
In case one of the transport blocks is disabled; the transport block to codeword mapping is specified according to Table 5.3.3.1.5-2. For the single enabled codeword, Value=4, 5, 6 in Table 5.3.3.1.5C-1 are only supported for retransmission of the corresponding transport block if that transport block has previously been transmitted using two, three or four layers, respectively.
If the number of information bits in format 2D carried by PDCCH belongs to one of the sizes in Table 5.3.3.1.2-1, one zero bit shall be appended to format 2D.
This is the end of the current example specification changes for format 2D.

Alternatively, bit field indicator value of '11' can also be used to indicate reduced overhead NCT DMRS pattern, if introduced. Similar changes also apply to other DCI formats such as DCI format 2B, DCI format 2C, and any future DCI formats introduced in the specification. Another example of the invention may require the following changes in DCI format 2D in Section 5.3.3.1.5D in [7]:

The following information is transmitted by means of the DCI format 2D:

Carrier indicator—0 or 3 bits. The field is present according to the definitions in [3].
Resource allocation header (resource allocation type 0/type 1)—1 bit as defined in section 7.1.6 of [3]
If downlink bandwidth is less than or equal to 10 PRBs, there is no resource allocation header and resource allocation type 0 is assumed.
Resource block assignment:
For resource allocation type 0 as defined in section 7.1.6.1 of [3] $\lceil N_{RB}^{DL}/P \rceil$ bits provide the resource allocation
For resource allocation type 1 as defined in section 7.1.6.2 of [3]
$\lceil \log_2(P) \rceil$ 1 bits of this field are used as a header specific to this resource allocation type to indicate the selected resource blocks subset
1 bit indicates a shift of the resource allocation span
$(|N_{RB}^{DL}/P|-\lceil \log_2(P) \rceil -1)$ bits provide the resource allocation
where the value of P depends on the number of DL resource blocks as indicated in section[7.1.6.1] of [3]
TPC command for PUCCH—2 bits as defined in section 5.1.2.1 of [3]
Downlink Assignment Index (this field is present in TDD for all the uplink-downlink configurations and only applies to TDD operation with uplink-downlink configuration 1-6. This field is not present in FDD)—2 bits
HARQ process number—3 bits (FDD), 4 bits (TDD)
Antenna port(s), scrambling identity and number of layers—3 bits as specified in Table 5.3.3.1.5C-1 where $n_{SCID}$ is the scrambling identity for antenna ports 7 and 8 defined in section 6.10.3.1 of [2]
SRS request—[0-1] bit. This field can only be present for TDD and if present is defined in section 8.2 of [3]

In addition, for transport block 1:
Modulation and coding scheme—5 bits as defined in section 7.1.7 of [3]
New data indicator-1 bit
Redundancy version—2 bits
In addition, for transport block 2:
Modulation and coding scheme—5 bits as defined in section 7.1.7 of [3]
New data indicator-1 bit
Redundancy version—2 bits
PDSCH RE Mapping and Quasi-Co-Location Indicator—2 bits as defined in sections 7.1.9 and 7.1.10 of [3]
HARQ-ACK resource offset (this field is present when this format is carried by EPDCCH. This field is not present when this format is carried by PDCCH)—2 bits as defined in section 10.1 of [3]. The 2 bits are set to 0 when this format is carried by EPDCCH on a secondary cell.
DMRS pattern indicator—1 bit—when set to zero or is not present, legacy DMRS patterns are used. When the bit is set to 1, reduced overhead DMRS patterns are used.

If both transport blocks are enabled; transport block 1 is mapped to codeword 0; and transport block 2 is mapped to codeword 1.

In case one of the transport blocks is disabled; the transport block to codeword mapping is specified according to Table 5.3.3.1.5-2. For the single enabled codeword, Value=4, 5, 6 in Table 5.3.3.1.5C-1 are only supported for retransmission of the corresponding transport block if that transport block has previously been transmitted using two, three or four layers, respectively.

If the number of information bits in format 2D carried by PDCCH belongs to one of the sizes in Table 5.3.3.1.2-1, one zero bit shall be appended to format 2D.

This is the end of the current example specification changes for DCI format 2D.

Similarly, in another embodiment of the invention, the 1 bit DMRS pattern indicator can indicate the transmission of new DMRS patterns used for new carrier type.

The indicator field can also be introduced in RRC signaling. One example of such indicator may utilize the following changes (shown in italics) in Section 6.3.2. of [8]:

AntennaInfo Information Elements

```
-- ASN1START
AntennaInfoCommon ::=                    SEQUENCE {
        antennaPortsCount                ENUMERATED {an1, an2, an4, spare1}
}
AntennaInfoDedicated ::=                 SEQUENCE {
        transmissionMode                 ENUMERATED {
                                                 tm1, tm2,
                                                 tm3, tm4,
                                                 tm5, tm6,
                                                 tm7, tm8-
                                                 v920},
        codebookSubsetRestriction        CHOICE {
            n2TxAntenna-tm3                      BIT
                STRING (SIZE (2)), n4TxAntenna-tm3   BIT
                STRING (SIZE (4)), n2TxAntenna-tm4   BIT
                STRING (SIZE (6)), n4TxAntenna-tm4   BIT
                STRING (SIZE (64)), n2TxAntenna-tm5  BIT
                STRING (SIZE (4)), n4TxAntenna-tm5   BIT
                STRING (SIZE (16)), n2TxAntenna-tm6  BIT
                STRING (SIZE (4)), n4TxAntenna-tm6   BIT
                STRING (SIZE (16))
        }       OPTIONAL,
        Cond TM
        ue-TransmitAntennaSelection      CHOICE{
                release                          NULL,
                setup                            ENUMERATED {closedLoop,
                                                 openLoop}
        }
}
```

-continued

```
}
AntennaInfoDedicated-v920 ::=         SEQUENCE {
        codebookSubsetRestriction-v920       CHOICE {
            n2TxAntenna-tm8-r9                      BIT
            STRING (SIZE (6)), n4TxAntenna-tm8-r9   BIT
            STRING (SIZE (32))
        }                                    OPTIONAL       --
        Cond TM8
}
AntennaInfoDedicated-r10 ::=          SEQUENCE {
        transmissionMode-r10                 ENUMERATED {
                            tm1, tm2, tm3, tm4, tm5, tm6, tm7,
                            tm8-v920, tm9-v1020, tm10-v1130,
                            spare6, spare5, spare4, spare3,
                            spare2, spare1},
        codebookSubsetRestriction-r10        BIT STRING OPTIONAL, -- Cond
        TMX
        ue-Transmit AntennaSelection         CHOICE{
            release                  NULL,
            setup                    ENUMERATED {closedLoop, openLoop}
        }
}
AntennaInfoDedicated-r12 ::=          SEQUENCE {
        transmissionMode-r12                 ENUMERATED {
                            tm1, tm2, tm3, tm4, tm5, tm6, tm7,
                            tm8-v920, tm9-v1020, tm10-v1130,
                            spare6, spare5, spare4, spare3,
                            spare2, spare1},
        codebookSubsetRestriction-r12        BIT STRING OPTIONAL, -- Cond
        TMX
        ue-Transmit AntennaSelection         CHOICE{
            release                  NULL,
            setup                    ENUMERATED {closedLoop, openLoop}
        enhancedDMRS-r12                     BIT STRING (SIZE (2)) OPTIONAL, -- Cond
        TMY
}
}
        -- ASN1STOP
```

AntennaInfo Field Descriptions antennaPortsCount

Parameter represents the number of cell specific antenna ports where an1 corresponds to 1, an2 to 2 antenna ports etc. see TS 36.211 [21, 6.2.1].

codebookSubsetRestriction

Parameter: codebookSubsetRestriction, see TS 36.213 [23, 7.2] and TS 36.211 [21, 6.3.4.2.3]. The number of bits in the codebookSubsetRestriction for applicable transmission modes is defined in TS 36.213 [23, Table 7.2-1b]. If the UE is configured with transmissionMode tm8, E-UTRAN only configures the field codebookSubsetRestriction if PMI/RI reporting is configured. If the UE is configured with transmissionMode tm9, E-UTRAN only configures the field codebookSubsetRestriction if PMI/RI reporting is configured and if the number of CSI-RS ports is greater than 1.

transmissionMode

Points to one of Transmission modes defined in TS 36.213 [23, 7.1] where tm1 refers to transmission model, tm2 to transmission mode 2 etc.

ue-TransmitAntennaSelection

For value setup the field indicates whether UE transmit antenna selection control is closed-loop or open-loop as described in TS 36.213 [23, 8.7]. EUTRAN configures the same value for all serving cells.

enhancedDMRS-r12

Parameter represents DMRS patterns selection. Value 0 means legacy DMRS pattern. Value 1 means NCT DMRS pattern. Value 2 means reduced overhead DMRS pattern. Value 4 is reserved for future use.

Conditional presence Explanation

TM The field is mandatory present if the transmissionMode is set to tm3, tm4, tm5 or Otherwise the field is not present and the UE shall delete any existing value for field.

TM8 The field is optional present, need OR, if AntennaInfoDedicated is included transmissionMode is set to tm8. If AntennaInfoDedicated is included transmissionMode is set to a value other than tm8, the field is not present and th shall delete any existing value for this field. Otherwise the field is not present and UE takes no action i.e. continues to use the existing value, if previously configured.

TMX The field is mandatory present if the transmissionMode-r10 is set to tm3, tm4, tm6, tm8 or tm9. Otherwise the field is not present and the UE shall delete any exis value for this field.

TMY The field is mandatory present if the transmissionMode-r12 is set to tm8-v920, v1020, or tm10-v1130. Otherwise the field is not present and the UE shall delete existing value for this field.

This is the end of the current example specification changes for RCC signaling.

Another embodiment of the indicator signal may utilize the following changes (shown in italics) in Section 6.3.2. of [8]:

AntennaInfo Information Elements

```
-- ASN1START
AntennaInfoCommon ::=         SEQUENCE {
    antennaPortsCount             ENUMERATED {an1, an2, an4, spare1}
```

-continued

```
}
AntennaInfoDedicated ::=         SEQUENCE {
    transmissionMode                 ENUMERATED {
                                         tm1, tm2, tm3,
                                         tm4, tm5, tm6,
                                         tm7, tm8-v920},
    codebookSubsetRestriction        CHOICE {
        n2TxAntenna-tm3                  BIT STRING
        (SIZE (2)), n4TxAntenna-tm3      BIT STRING
        (SIZE (4)), n2TxAntenna-tm4      BIT STRING
        (SIZE (6)), n4TxAntenna-tm4      BIT STRING
        (SIZE (64)), n2TxAntenna-tm5     BIT STRING
        (SIZE (4)), n4TxAntenna-tm5      BIT STRING
        (SIZE (16)), n2TxAntenna-tm6     BIT STRING
        (SIZE (4)), n4TxAntenna-tm6      BIT STRING
        (SIZE (16))
    }       OPTIONAL,                               -- Cond TM
    ue-Transmit AntennaSelection     CHOICE{
        release                          NULL,
        setup                            ENUMERATED {closedLoop,
                                             openLoop}
    }
}
AntennaInfoDedicated-v920 ::=    SEQUENCE {
    codebookSubsetRestriction-v920   CHOICE {
        n2TxAntenna-tm8-r9               BIT STRING
        (SIZE (6)), n4TxAntenna-tm8-r9   BIT STRING
        (SIZE (32))
    }       OPTIONAL                              -- Cond TM8
}
AntennaInfoDedicated-r10 ::=     SEQUENCE {
    transmissionMode-r10             ENUMERATED {
                                         tm1, tm2, tm3, tm4, tm5, tm6, tm7,
                                         tm8-v920, tm9-v1020, tm10-v1130,
                                         spare6, spare5, spare4, spare3,
                                         spare2, spare1},
    codebookSubsetRestriction-r10    BIT STRING OPTIONAL, -- Cond TMX
    ue-Transmit AntennaSelection     CHOICE{
        release                          NULL,
        setup                            ENUMERATED {closedLoop,
                                             openLoop}
    }
}
AntennaInfoDedicated-r12 ::=     SEQUENCE {
    transmissionMode-r12             ENUMERATED {
tm1, tm2, tm3, tm4, tm5, tm6, tm7,
tm8-v920, tm9-v1020, tm10-v1130,
spare6, spare5, spare4, spare3,
spare2, spare1},
    codebookSubsetRestriction-r12    BIT STRING OPTIONAL, -- Cond TMX
    ue-Transmit AntennaSelection     CHOICE{
        release                          NULL,
        setup                            ENUMERATED {closedLoop,
                                             openLoop}
    enhancedDMRS-r12                 BIT STRING
    }
}
-- ASN1STOP
```

AntennaInfo Field Descriptions
antennaPortsCount
Parameter represents the number of cell specific antenna ports where an1 corresponds to 1, an2 to 2 antenna ports etc. see TS 36.211 [21, 6.2.1].
codebookSubsetRestriction
Parameter: codebookSubsetRestriction, see TS 36.213 [23, 7.2] and TS 36.211 [21, 6.3.4.2.3]. The number of bits in the codebookSubsetRestriction for applicable transmission modes is defined in TS 36.213 [23, Table 7.2-1b]. If the UE is configured with transmissionMode tm8, E-UTRAN only configures the field codebookSubsetRestriction if PMI/RI reporting is configured. If the UE is configured with transmissionMode tm9, E-UTRAN only configures the field codebookSubsetRestriction if PMI/RI reporting is configured and if the number of CSI-RS ports is greater than 1.

transmissionMode
Points to one of Transmission modes defined in TS 36.213 [23, 7.1] where tm1 refers to transmission mode 1, tm2 to transmission mode 2 etc.
ue-TransmitAntennaSelection
For value setup the field indicates whether UE transmit antenna selection control is closed-loop or open-loop as described in TS 36.213 [23, 8.7]. EUTRAN configures the same value for all serving cells.
enhancedDMRS-r12
Parameter represents DMRS patterns selection. Value 0 means legacy DMRS pattern. Value 1 means reduced overhead DMRS pattern.

This is the end of the current example specification changes for signaling.

In another example embodiment, the bit string may be optional. In a further embodiment the Value 1 can indicate new DMRS pattern for NCT transmission.

FIG. 8 is a block diagram of a specifically programmed computer system to act as one or more different types of devices, such as user equipment, cell stations, including small cell stations and macro stations. The system may be used to implement one or more methods according to the examples described. In the embodiment shown in FIG. 8, a hardware and operating environment is provided to enable the computer system to execute one or more methods and functions that are described herein. In some embodiments, the system may be a small cell station, macro cell station, smart phone, tablet, or other networked device that can provide access and wireless networking capabilities to one or more devices. Such devices need not have all the components included in FIG. 8.

FIG. 8 illustrates a functional block diagram of a cell station 800 in accordance with some embodiments. Cell station 800 may be suitable for use as a small cell station, macro cell station, or user equipment, such as a wireless cell phone, tablet or other computer. The cell station 800 may include physical layer circuitry 802 for transmitting and receiving signals to and from eNBs using one or more antennas 801. Cell station 800 may also include processing circuitry 804 that may include, among other things a channel estimator. Cell station 800 may also include memory 806. The processing circuitry may be configured to determine several different feedback values discussed below for transmission to the eNB. The processing circuitry may also include a media access control (MAC) layer.

In some embodiments, the cell station 800 may include one or more of a keyboard, a display, a non-volatile memory port, multiple antennas, a graphics processor, an application processor, speakers, and other mobile device elements. The display may be an LCD screen including a touch screen.

The one or more antennas 801 utilized by the cell station 800 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $1/10$ of a wavelength or more.

Although the cell station 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the cell station 800 may be configured with the instructions to perform the operations described herein.

In some embodiments, the cell station 800 may be configured to receive OFDM communication signals over a multi-carrier communication channel in accordance with an OFDMA communication technique. The OFDM signals may comprise a plurality of orthogonal subcarriers. In some broadband multicarrier embodiments, evolved node Bs (NBs) may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the cell station 800 and the eNBs may be configured to communicate in accordance with an orthogonal frequency division multiple access (OFDMA) technique. The UTRAN LTE standards include the 3rd Generation Partnership Project (3GPP) standards for UTRAN-LTE, release 8, March 2008, and release 10, December 2010, including variations and evolutions thereof.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain) In these embodiments, the PRB may comprise a plurality of resource elements (REs). A RE may comprise one sub-carrier×one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the cell station 800 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the cell station 800 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the cell station 800 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the cell station and reported to the eNB. In some embodiments, the cell station may transmit a physical uplink control channel (PUCCH) of format 2, 2a or 2b containing the CQI/PMI or RI.

In these embodiments, the CQI may be an indication of the downlink mobile radio channel quality as experienced by the cell station 800. The CQI allows the cell station 800 to propose to an eNB an optimum modulation scheme and coding rate to use for a given radio link quality so that the resulting transport block error rate would not exceed a certain value, such as 10%. In some embodiments, the cell station may report a wideband CQI value which refers to the channel quality of the system bandwidth. The cell station may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a cell station in which two or more cooperating/coordinating points, such as remote-radio heads (RRHs) transmit jointly. In these embodiments, the joint transmissions may be MIMO transmissions and the cooperating points are configured to perform joint beamforming.

LTE Channel Estimation

To facilitate the estimation of the channel characteristics LTE uses cell specific reference signals (i.e., pilot symbols) inserted in both time and frequency. These pilot symbols provide an estimate of the channel at given locations within a subframe. Through interpolation it is possible to estimate the channel across an arbitrary number of subframes. The pilot symbols in LTE are assigned positions within a subframe depending on the eNodeB cell identification number and which transmit antenna is being used, as shown in the figure below. The unique positioning of the pilots ensures that they do not interfere with one another and can be used to provide a reliable estimate of the complex gains imparted onto each resource element within the transmitted grid by the propagation channel.

To minimize the effects of noise on the pilot estimates, the least square estimates are averaged using an averaging window. This simple method produces a substantial reduction in the level of noise found on the pilots. There are two pilot symbol averaging methods available.

Time averaging is performed across each pilot symbol carrying subcarrier, resulting in a column vector containing an average amplitude and phase for each reference signal carrying subcarrier.

All the pilot symbols found in a subcarrier are time averaged across all OFDM symbols, resulting in a column vector containing the average for each reference signal subcarrier, The averages of the pilot symbol subcarriers are then frequency averaged using a moving window of maximum size.

In some embodiments, The PSS and SSS provide the cell station with its physical layer identity within the cell. The signals may also provide frequency and time synchronization within the cell. The PSS may be constructed from Zadoff-Chu (ZC) sequences and the length of the sequence may be predetermined (e.g., 62) in the frequency domain. The SSS uses two interleaved sequences (i.e., maximum length sequences (MLS), SRGsequences or m-sequences) which are of a predetermined length (e.g., 31). The SSS may be scrambled with the PSS sequences that determine physical layer ID. One purpose of the SSS is to provide the cell station with information about the cell ID, frame timing properties and the cyclic prefix (CP) length. The cell station may also be informed whether to use TDD or FD. In FDD, the PSS may be located in the last OFDM symbol in first and eleventh slot of the frame, followed by the SSS in the next symbol. In TDD, the PSS may be sent in the third symbol of the 3rd and 13th slots while SSS may be transmitted three symbols earlier. The PSS provided the cell station with information about to which of the three groups of physical layers the cell belongs to (3 groups of 168 physical layers). One of 168 SSS sequences may be decoded right after PSS and defines the cell group identity directly.

In some embodiments, the cell station may be configured in one of 8 "transmission modes" for PDSCH reception; Mode 1: Single antenna port, port 0; Mode 2: Transmit diversity; Mode 3: Large-delay CDD; Mode 4: Closed-loop spatial multiplexing; Mode 5: MU-MIMO; Mode 6: Closed-loop spatial multiplexing, single layer; Mode 7: Single antenna port, cell station-specific RS (port 5); Mode 8 (new in Rel-9): Single or dual-layer transmission with cell station-specific RS (ports 7 and/or 8). The CSI-RS are used by the cell station for channel estimates (i.e., CQI measurements). In some embodiments, the CSI-RS are transmitted periodically in particular antenna ports (up to eight transmit antenna ports) at different subcarrier frequencies (assigned to the cell station) for use in estimating a MIMO channel. In some embodiments, a cell station-specific demodulation reference signal (e.g., a DM-RS) may be precoded in the same way as the data when non-codebook-based precoding is applied.

EXAMPLES

1. A device comprising:
a transceiver;
a processor; and
a memory having instructions for execution by the processor to:
 receive an indicator field;
 use the received indicator field to identify whether a reduced overhead demodulation reference signal (DMRS) pattern is being transmitted; and
 decode the DMRS pattern as a function of the indicator field.

2. The device of example 1 wherein the reduced DMRS pattern is reduced in frequency.

3. The device of any of examples 1-2 wherein the reduced DRMS pattern is reduced in time.

4. The device of any of examples 1-3 wherein the reduced DRMS pattern is reduced in frequency and in time.

5. The device of any of examples 1-4 wherein the indicator field identifies the reduced DRMS pattern when channel conditions are not deteriorated.

6. The device of any of examples 1-5 wherein the indicator field comprises bits in a downlink control information (DCI) signal.

7. The device of any of examples 1-6 wherein the indicator field comprises bits in a radio resource control (RRC) signal.

8. The device of any of examples 1-7 wherein the indicator field comprises:
 a first bit to indicate a type of pattern; and
 a second bit to identify transmission of a reduced pattern.

9. The device of any of examples 1-8 wherein the mobile device is communicating directly with a small cell station.

10. A system comprising:
 a transceiver having a power range corresponding to a small cell station;
 a processor; and
 a memory having instructions for execution by the processor to:
  determine whether a reduced overhead demodulation reference signal (DMRS) pattern is appropriate for communications with multiple mobile devices communicatively coupled to the system operating as a small cell station;
  generate an indicator field to identify whether a reduced overhead DRMS pattern is being transmitted;
  generate the reduced overhead DMRS pattern; and cause the indicator field and the pattern to be transmitted by the transceiver.

11. The system of example 11 wherein the reduced DMRS pattern is reduced in frequency.

12. The system of any of any of examples 10-11 wherein the reduced DMRS pattern is reduced in time.

13. The system of any of examples 10-12 wherein the reduced DRMS pattern is reduced in frequency and in time.

14. The system of any of examples 10-13 wherein the indicator field identifies the reduced DRMS pattern when channel conditions are not deteriorated.

15. The system of any of examples 10-14 wherein the indicator field comprises:
 a first bit to indicate a type of pattern; and
 a second bit to identify transmission of a reduced pattern.

16. The system of any of examples 10-15 wherein the small cell station is communicating directly with mobile devices.

17. A method comprising:
 determining via a small cell station whether a reduced overhead demodulation reference signal (DMRS) pattern is appropriate for communications with multiple mobile devices communicatively coupled to the system operating as a small cell station;
 generating via the small cell station an indicator field to identify whether a reduced overhead DMRS pattern is being transmitted;
 generating via the small station the reduced overhead DMRS pattern; and transmitting the indicator field and the reduced overhead DMRS pattern.

18. The method of example 17 wherein the reduced DMRS pattern is reduced in frequency and in time.

19. The method of any of examples 17-18 wherein generating the indicator field comprises:
 setting a first bit to indicate a type of pattern; and
 setting a second bit to identify transmission of a reduced pattern.

20. The method of example 19 wherein the small cell station is transmitting directly to mobile devices.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
 a transceiver having a power range corresponding to a small cell station;
 a processor; and
 a memory having instructions for execution by the processor to:
  determine whether a reduced overhead demodulation reference signal (DMRS) pattern is appropriate for communications with multiple mobile devices communicatively coupled to the system operating as a small cell station;
  generate an indicator field to identify whether a reduced overhead DMRS pattern is being transmitted, wherein the indicator field comprises two bits to indicate (1) whether the DMRS pattern corresponds to a new carrier type (NCT) DMRS pattern, (2) a legacy DMRS pattern, and (3) whether the DMRS pattern is a reduced overhead DMRS pattern;
  generate the DMRS pattern consistent with the indicator field; and
  cause the indicator field and the DMRS pattern to be transmitted by the transceiver.

2. The system of claim 1 wherein the reduced DMRS pattern is reduced in frequency by using a lesser number of subcarriers that include a resource element of the DMRS pattern.

3. The system of claim 2, wherein the DMRS pattern includes a resource element in only one or two sub-carriers and only one or two symbols of a slot.

4. The system of claim 3, wherein the sub-carriers include sub-carriers one, six, or eleven.

5. The system of claim 3, wherein the sub-carriers include only sub-carrier six.

6. The system of claim 3, wherein the sub-carriers include only sub-carriers one and eleven.

7. The system of claim 3, wherein the symbols include only symbols five and six.

8. The system of claim 3, wherein the DMRS pattern is repeated in consecutive slots.

9. The system of claim 3, wherein the DMRS pattern is different in consecutive slots.

10. The system of claim 9, wherein the DMRS pattern includes first resource elements in symbols five and six of only sub-carriers one and eleven of a first slot of the consecutive slots and includes second resource elements in symbols five and six of only sub-carrier six of a second slot of the consecutive slots.

11. The system of claim 1 wherein the reduced DMRS pattern is reduced in time by using a lesser number of symbols that include a resource element of the DMRS pattern.

12. The system of claim 1 wherein the reduced DMRS pattern is reduced in frequency and in time by using a lesser number of subcarriers that include a resource element of the DMRS pattern and using a lesser number of symbols that include a resource element of the DMRS pattern.

13. The system of claim 1 wherein the indicator field identifies the reduced DMRS pattern when channel conditions are not deteriorated.

14. The system of claim 1 wherein the small cell station is communicating directly with mobile devices.

15. The system of claim 1, wherein the DMRS pattern includes twelve resource elements in each of two consecutive slots.

16. The system of claim 15, wherein the DMRS pattern includes resource elements in symbols one and two or two and three of sub-carriers zero, one, five, six, ten and eleven of a first slot of the consecutive slots and resource elements in symbols twelve and thirteen of sub-carriers zero, one, five, six, ten and eleven of a second slot of the consecutive slots.

17. A method comprising:
    determining via a small cell station whether a reduced overhead demodulation reference signal (DMRS) pattern is appropriate for communications with multiple mobile devices communicatively coupled to the system operating as a small cell station;
    generating via the small cell station an indicator field to identify whether a reduced overhead DMRS pattern is being transmitted, wherein the indicator field comprises two bits to indicate (1) whether the DMRS pattern corresponds to a new carrier type (NCT) DMRS pattern, (2) a legacy DMRS pattern, and (3) whether the DMRS pattern is a reduced overhead DMRS pattern;
    generating via the small station the DMRS pattern consistent with the indicator field; and
    transmitting the indicator field and the reduced overhead DMRS pattern.

18. The method of claim 17 wherein the reduced DMRS pattern is reduced in frequency and in time.

19. The method of claim 17 wherein the small cell station is transmitting directly to mobile devices.

* * * * *